United States Patent
Vaquero Gonzalez

(10) Patent No.: US 10,503,636 B2
(45) Date of Patent: Dec. 10, 2019

(54) CONCURRENT HIERARCHICAL DEAD ACTOR COLLECTION IN A DISTRIBUTED SYSTEM

(71) Applicant: HEWLETT PACKARD ENTERPRISE DEVELOPMENT LP, Houston, TX (US)

(72) Inventor: Luis Miguel Vaquero Gonzalez, Bristol (GB)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 0 days.

(21) Appl. No.: 15/320,402

(22) PCT Filed: Jun. 30, 2014

(86) PCT No.: PCT/US2014/044875
§ 371 (c)(1),
(2) Date: Dec. 20, 2016

(87) PCT Pub. No.: WO2016/003412
PCT Pub. Date: Jan. 7, 2016

(65) Prior Publication Data
US 2017/0147488 A1    May 25, 2017

(51) Int. Cl.
*G06F 12/00* (2006.01)
*G06F 12/02* (2006.01)
(Continued)

(52) U.S. Cl.
CPC ...... *G06F 12/0261* (2013.01); *H04L 12/6418* (2013.01); *G06F 12/12* (2013.01); *G06F 2212/154* (2013.01)

(58) Field of Classification Search
CPC .......... G06F 12/0261; G06F 2212/154; G06F 2212/69; G06F 12/6418
See application file for complete search history.

(56) References Cited

U.S. PATENT DOCUMENTS 6,226,761 B1  5/2001  Berstis
6,611,858 B1  8/2003  Aravamudan et al.
(Continued)

OTHER PUBLICATIONS

Clebsch et al., "Fully Concurrent Garbage Collection of Actors on Many-Core Machines", Oct. 2013, pp. 553-570.*
(Continued)

*Primary Examiner* — Arvind Talukdar
(74) *Attorney, Agent, or Firm* — Hewlett Packard Enterprise Patent Department

(57) ABSTRACT

Examples relate to providing concurrent dead actor collection. In some examples, a blocked notification is received from an actor of a number of actors in a distributed system, where the actors are arranged in an actor hierarchy that describes communication links between the actors. In response to receiving the blocked notification, a blocked status is requested from each other actor in a loop subset of the actors, where each of the other actors is connected to the actor in the actor hierarchy by an incoming edge. After using the blocked status of each of the other actors to determine that incoming edges of the actor refer to blocked actors, the actor is designated for garbage collection.

15 Claims, 4 Drawing Sheets

(51) Int. Cl.
*H04L 12/64* (2006.01)
*G06F 12/12* (2016.01)

(56) References Cited

U.S. PATENT DOCUMENTS

| | | | |
|---|---|---|---|
| 8,126,940 | B2 | 2/2012 | Bacon et al. |
| 8,595,391 | B1 | 11/2013 | Miller et al. |
| 2002/0107880 | A1 | 8/2002 | Bacon |
| 2010/0333110 | A1 | 12/2010 | Luo et al. |
| 2011/0004641 | A1 | 1/2011 | Roberts |
| 2011/0145553 | A1* | 6/2011 | Levanoni ............... G06F 9/466 712/229 |

OTHER PUBLICATIONS

Varela et al. "The Sals Programming Language 1.1.2 Rease Tutorial", Feb. 2007, pp. 1-58.*

Blessing, "A String of Ponies, Transparent Distributed Programming with Actors", Sep. 2013, Imperial College (Year: 2013).*

B. Seetha Lakshmi et al., "Actor Garbage Collection in Distributed Systems Using Graph Transformation," Oct. 7, 2011, pp. 1-11, KLN College of Information Technology, India.

International Search Report and Written Opinion, International Application No. PCT/US2014/044875, dated Feb. 26, 2015, pp. 1-8, KIPO.

Sylvan Clebsch and Sophia Drossopoulou, "Fully Concurrent Garbage Collection of Actors on Many-Core Machines," OOPSLA, Oct. 2013, pp. 1-18, ACM.

Wei-Jen Wang and Carlos A. Varela, "A Non-blocking Snapshot Algorithm for Distributed Garbage Collection of Mobile Active Objects," May 3, 2007, pp. 1-24, Rensselaer Polytechnic Institute.

Yaroslav Hayduk et al., "Speculative Concurrent Processing with Transactional Memory in the Actor Model," Jun. 30, 2013, pp. 1-15, University of Neuchatel, Switzerland.

Joe Armstrong, "A history of Erlang", In Proceedings of the third ACM SIGPLAN conference on History of programming languages (HOPL ILL), ACM, New York, NY, USA, 2007, pp. 6-1-6-26.

Haller et al., "Scala actors: Unifying thread-based and event-based programming", Theoretical Computer Science, Jun. 16, 2008, 36 pages, doi:10.1016/j.tcs.2008.09.019 http://infoscience.epfl.ch/record/128406/files/haller_tcs2008_accepted.pdf.

* cited by examiner

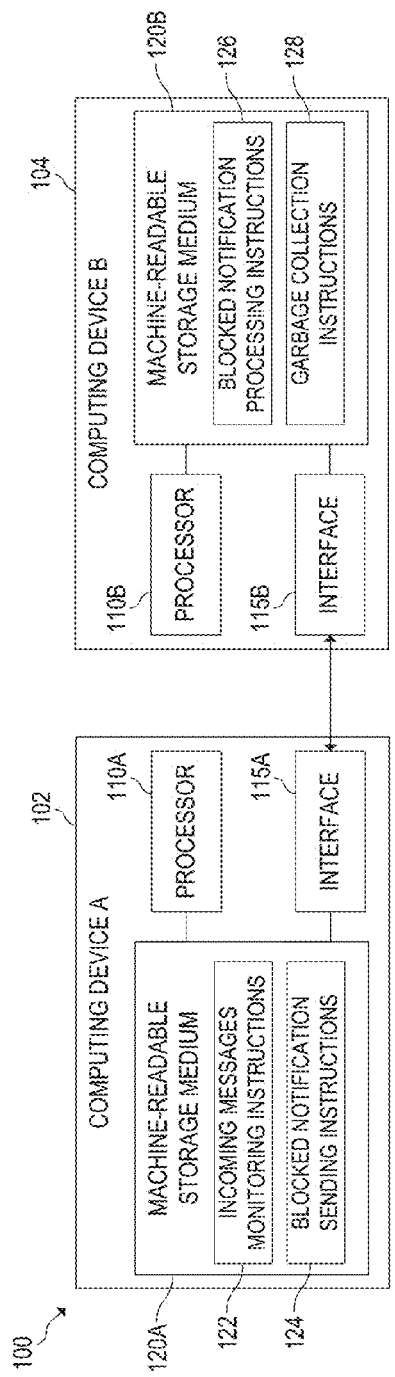
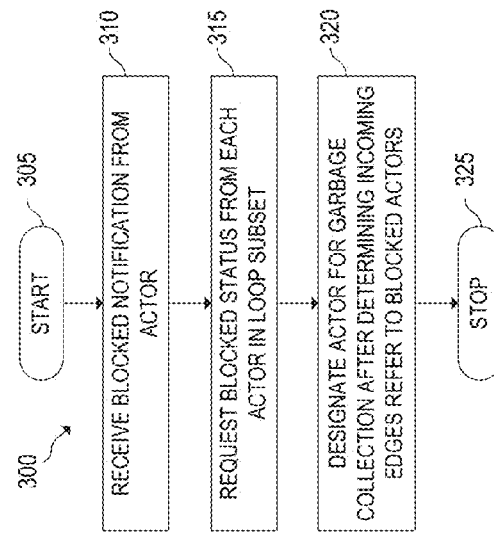

CONCURRENT HIERARCHICAL DEAD ACTOR COLLECTION IN A DISTRIBUTED SYSTEM

BACKGROUND

Actors are commonly used to facilitate concurrent programming on many-core machines. After an actor has completed its tasks, the actor's associated resources should be collected for reuse. In many cases, actor-able languages and libraries rely on developers to finalize their actors explicitly. Typical automated garbage collection mechanisms in many programming languages can also be used to collect dead actors. In this case, the garbage collection may rely on synchronization mechanisms (e.g., barriers and locks) and cache coherence that do not allow for concurrent or dead actors collection.

BRIEF DESCRIPTION OF THE DRAWINGS

The following detailed description references the drawings, wherein:

FIG. 1 is a block diagram of an example computing device for concurrent dead actor collection;

FIG. 3 is a flowchart of an example method for execution by a computing device for providing concurrent dead actor collection;

DETAILED DESCRIPTION

Figure 2:
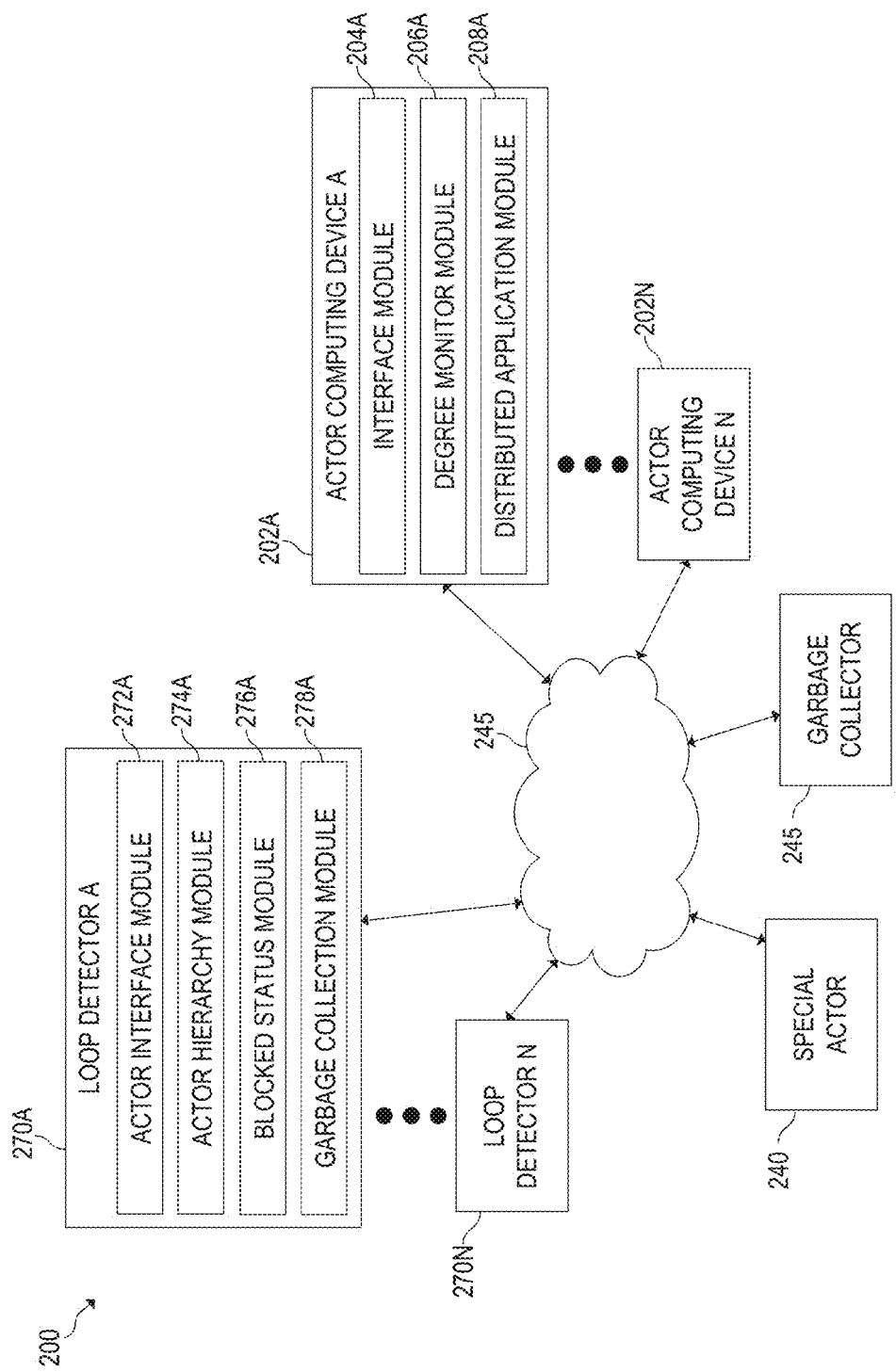
FIG. 2 is a block diagram of an example distributed system in communication over a network for providing concurrent dead actor collection.

As discussed above, garbage collection for actor-able languages and actor frameworks (e.g., Simple Actor Language System and Architecture (SALSA), AmbientTalk, Erlang, etc.) is typically unable to provide concurrent or dead actors collection. In examples described herein, dead actors are correctly identified and designated for garbage collection, where live actors can continue execution while the dead actors are concurrently collected. The actor model states that an actor can send a finite number of asynchronous messages to a buffer addressed to other actors with no delivery guarantees, then the other actors select a proper behavior to handle the next incoming message and may create a finite number of child actors. Once an actor has finished its queue of incoming messages, the actor is considered to be blocked. If a blocked actor is referenced by only blocked actors, then the actor is also considered to be a dead actor.

Examples described herein use an actor hierarchy to enable concurrent collection of dead actors. Specifically, each actor monitors incoming messages to determine when the actor becomes blocked. The actors in a distributed system may be configured according to the actor hierarchy such that a loop detector manages garbage collection for a subset of actors in the hierarchy. A loop detector is a specialized actor in the distributed system that monitors the blocked status of a subset of actors. Based on the blocked status of the actors in the subset, the loop detector is able to designate actors for garbage collection. Specifically, the blocked actor can send a blocked notification to the loop detector, which then checks the blocked status of actors in the subset. If the incoming edges of the blocked actor are from other blocked actors, the loop detector can designated the blocked actor for garbage collection.

The actor hierarchy describes the relationship between actors in the distributed system. With respect to an actor, incoming edges in the actor hierarchy correspond to messages received by the actor, and outgoing edges correspond to messages sent by the actor. The reference count for the incoming edges and the outgoing edges can be separately monitored by each actor in the distributed system. For example, as incoming messages are received by the actor, the reference count for incoming edges is incremented. In this example, as the incoming messages are handled, the reference count is decremented. When the reference count becomes zero, the actor is designated as blocked.

Examples disclosed herein provide concurrent dead actor collection. In some examples, a blocked notification is received from an actor of a number of actors in a distributed system, where the actors are arranged in an actor hierarchy that describes communication links between the actors. In response to receiving the blocked notification, a blocked status is requested from each other actor in a loop subset of the actors, where each of the other actors is connected to the actor in the actor hierarchy by an incoming edge. After using the blocked status of each of the other actors to determine that incoming edges of the actor refer to blocked actors, the actor is designated for garbage collection.

Referring now to the drawings, FIG. 1 is a block diagram of an example computing devices 102, 104 for providing concurrent dead actor collection. Each computing devices 102, 104 may be any computing device (e.g., server, distributed node, desktop computer, etc.) that can be configured for a distributed system. In the example of FIG. 1, each computing device 102, 104 includes a processor 110A, 110B, an interface 115A, 115B, and a machine-readable storage medium 120A, 120B.

Each processor 110A, 110B may be any number of central processing units (CPUs), microprocessors, and/or other hardware devices suitable for retrieval and execution of instructions stored in machine-readable storage medium 120A, 12B. Processor 110A, 110B may fetch, decode, and execute instructions 122, 124 or 126, 128, respectively, to provide concurrent dead actor collection as described below. As an alternative or in addition to retrieving and executing instructions, processor 110A, 110B may include any number of electronic circuits comprising a number of electronic components for performing the functionality of instructions 122, 124 or 126, 128.

Each interface 115A, 115B may include a number of electronic components for communicating with networked devices. For example, each interface 115A, 115B may be an Ethernet interface, a Universal Serial Bus (USB) interface, an IEEE 1394 (Firewire) interface, an external Serial Advanced Technology Attachment (eSATA) interface, or any other physical connection interface suitable for communication with other nodes in a distributed system. Alternatively, each interface 115A, 115B may be a wireless interface, such as a wireless local area network (WLAN) interface or a near-field communication (NFC) interface. In operation, as detailed below, each interface 115A, 115B may be used to send and receive data to and from a corresponding interface(s) of distributed nodes.

Each machine-readable storage medium 120A, 120B may be any electronic, magnetic, optical, or other physical storage device that stores executable instructions. Thus, each machine-readable storage medium 120A, 120B may be, for example, Random Access Memory (RAM), an Electrically- Erasable Programmable Read-Only Memory (EEPROM), a storage drive, an optical disc, and the like. As described in detail below, each machine-readable storage medium 120A, 120B may be encoded with executable instructions for providing concurrent dead actor collection.

On computing device A 102, incoming messages monitoring instructions 122 monitors the processing of incoming messages to determine a reference count of computing device A 102. The reference count for incoming messages is the number of incoming messages that are queued for processing on computing device A 102. After an incoming message is processed, the reference count is decremented. As incoming messages are received and processed, computing device A 102 updates the reference count accordingly. If the reference count becomes zero, a blocked notification may be sent as described below.

Blocked notification sending instructions 124 of computing device A 102 sends a blocked notification to computing device B 104. After computing device A 102 has processed all incoming messages and determined that the reference count is zero, the blocked notification is sent to computing device B 104, which in this example may be a loop detector. The blocked notification notifies computing device B 104 that computing device A 102 is blocked and a candidate for garbage collection.

On computing device B 104, blocked notification processing instructions 126 receive and process the blocked notification from computing device A 102. The blocked notification signals that computing device A 102 is a candidate for garbage collection. In response to the blocked notification, blocked notification processing instructions 126 may request a blocked status for each actor in a loop subset managed by computing device B 104. The loop subset includes actors (e.g., computing device A 102) that are related via communication links such that computing device A 102 should be designated for garbage collection if all actors in the loop subset are also blocked as described below. In this example, blocked notification processing instructions 126 may receive a blocked or unblocked notification from each of the actors in the loop subset, which allows computing device B 104 to update the portion of the actor hierarchy that corresponds to the loop subset.

Garbage collection instructions 128 manages garbage collection for actors in the loop subset. If garbage collection instructions 128 determine that all actors in the loop subset are blocked, the actor executing on computing device A 102A can be designated for garbage collection (i.e., the actor is a dead actor that is no longer in use). Computing device B 104 monitors each actor in the loop subset as described above to determine when each actor should be collected.

FIG. 2 is a block diagram of an example distributed system 200 in communication over a network 245 for providing concurrent dead actor collection. As illustrated, actor computing devices 202A, 202N interact with loop detectors 270A, 270N to manage garbage collection for actors executing on the actor computing devices 202A, 202N.

Similar to computing device A 102 of FIG. 1, actor computing device A 202A may be a server, distributed node, desktop computer, or any other device suitable for executing the functionality described below. As detailed below, actor computing device A 202A may include a series of modules 204A-208A for providing functionality for distributed system 200. As shown, actor computing device A 202A includes interface module 204A, degree monitor module 206A, and distributed application module 208A.

Interface module 204A may manage communications with other networked devices (e.g., loop detectors 270A, 270N, special actor 240, actor computing device N 202N, etc.). Specifically, interface module 204A may initiate connections over network 245 with the networked devices and then send blocked notifications to and receive messages from the networked devices 202N, 240, 270A, 270N.

Degree monitor module 206A monitors the reference count of incoming and outgoing references of an actor provided by actor computing device A 202A. As incoming messages are received from other actor computing devices (e.g., actor computing device N 202N), the reference count for incoming references is determined by counting incoming messages that have not been handled. Similarly, as outgoing messages are sent to other actor computing devices (e.g., actor computing device N 202N), the reference count for outgoing references is determined by counting outgoing messages that have not been handled. By monitoring the reference counts of incoming and outgoing messages, degree monitor module 206A creates a local graph of the actor hierarchy for the actor provided by actor computing device A 202A.

The monitoring of reference counts by degree monitor module 206A is a lazy mechanism that may result in inaccurate reference counts. For example, satisfied incoming messages may not be detected in a timely fashion, which results in some dead actors remaining in the distributed system longer than needed. The lazy mechanism is tolerated because it ensures that only truly dead actors are collected.

In some cases, the actor computing devices (e.g., actor computing device N 202N) monitor each other according to the actor hierarchy. Specifically, the actor computing devices (e.g., actor computing device N 202N) of the actors are configured according to the parent-child relationships in the actor hierarchy. In this case, a child actor may send blocked notifications to its parent actor, which may then (1) determine if the child actor should be designated for garbage collection as described with respect to the loop detectors (e.g., loop detector A 270A, loop detector N 270N) below (i.e., the parent actor may act as a loop detector) or (2) propagate the blocked notification to the parent of the parent actor.

Further, some actor computing devices (e.g., actor computing device N 202N) may provide actors that exist outside the actor hierarchy. With respect to the actors outside the hierarchy, distributed system 200 behaves in a non-causal fashion that produces some transient inconsistencies (i.e., dead actors not being timely collected). If a message arrives for a child actor and the child actor no longer exists (e.g., the child actor was removed due to lack of causality or a message timeout), the parent actor may introspect on the message and decide if the child actor should be recreated to process the message or if the child actor should stay deleted and the sender be informed to update the sender's view of the actor hierarchy.

Distributed application module 208A provides actor functionality for distributed system 200. For example, if the actor of actor computing device A is a router management module, distributed application module 208A may be a router management application. Distributed application module 208A may use services and resources of other actors (e.g., actor computing device N 202N) as shown in the actor hierarchy of distributed system 200.

In FIG. 2, actor computing device A 202A shows modules 204A-208A, which also exist in actor computing device N 202N but are not shown to simplify the figure. Any number of actor computing devices (e.g., actor computing device A 202A, actor computing device N 202N) can be included in distributed system 200. Each actor computing device 202A, 202N may be associated with a number of loop subsets of distributed system 200, where a loop subset specifies a set of actors provided by actor computing devices 202A, 202N that are related in actor hierarchy because of communication between the set of actors. Further, each actor computing device 202A, 202N may provide any number of actors depending on the configuration of distributed system 200.

Special actor 240 is configured to provide local variables and referenced provided by the runtime system. In the actor hierarchy, special actor 240 only has outgoing edges for providing its variables and runtimes to other actors. Special actor 240 is typically not considered as a candidate for garbage collection.

Garbage collector 245 performs garbage collection for distributed system 200. Specifically, garbage collector 245 collects resources of actors that have been designated for garbage collection. Garbage collector 245 is configured to concurrently collect resources as live actors (e.g., actor computing device A 202A, actor computing device N 202N) in distributed system 200 continue to operate.

Similar to computing device B 104 of FIG. 1, loop detector A 270A may be a server, distributed node, desktop computer, or any other device suitable for executing the functionality described below. As detailed below, loop detector A 270A may include a series of modules 272A-278A for providing concurrent dead actor collection. As shown, loop detector A 270A includes actor interface module 272A, actor hierarchy module 274A, blocked status module 276A, and garbage collection module 278A.

Actor interface module 272A may manage communications with other networked devices (e.g., loop detector N 270N, special actor 240, actor computing devices 202A, 202N, etc.). Specifically, interface module 272A may initiate connections over network 245 with the networked devices and then send blocked requests to and receive blocked notifications from the networked devices 202A, 202N, 240, 270N.

Actor hierarchy module 274A may monitor the actor hierarchy of a loop subset associated with loop detector A 270A. The loop subset includes actors (e.g., actor computing device A 202A, actor computing device N 202N) that can be linked by outgoing or incoming messages. In other words, actor hierarchy module 274A may monitor communication activities between actors (e.g., actor computing device A 202A, actor computing device N 202N) to determine incoming and outgoing edges in the actor hierarchy.

Blocked status module 276A may update the actor hierarchy by collecting blocked status information from actors (e.g., actor computing device A 202A, actor computing device N 202N) in the loop subset. Blocked status information allows the blocked status module 276A to determine whether each actor is blocked or unblocked.

Garbage collection module 278A may identify dead actors in the loop subset based on the actor hierarchy. Specifically, garbage collection module 278A may identify blocked actors (e.g., actor computing device A 202A, actor computing device N 202N) that are referred to by other blocked actors as dead actors. After a dead actor is identified, garbage collection module 278A may designate the dead actor for garbage collection. Garbage collection can then collect the resources attributed to the dead actors so that the resources may be allocated to other actors in distributed system 200.

In some cases, message causality can be assumed in distributed system 200. For example, if distributed system 200 exists within a single server rack, it can be assumed that messages are received by their recipients in the same order that the messages are sent by the senders. In other cases, different latencies among devices (e.g., actor computing device A 202A, actor computing device N 202N, loop detector A 270A, loop detector N 270N, etc.) can cause messages to arrive in a different order than the messages were sent. In this case, the latency of the remote devices is accommodated for by the loop detectors (e.g., loop detector A 270A, loop detector N 270N, etc.) when monitoring the blocked status of the actors provided by actor computing devices (e.g., actor computing device A 202A, actor computing device N 202N). When message causality is applied in the actor hierarchy, messages may be sent in a generational fashion such that the messages transferred from grandparents to grandchildren pass through children as an intermediate steps.

In FIG. 2, loop detector A 270A shows modules 272A-278A, which also exist in loop detector N 270N but are not shown to simplify the figure. Any number of loop detectors (e.g., loop detector A 270A, loop detector N 270N) can be included in distributed system 200. Each loop detector 270A, 270N may manage a number of loop subsets of distributed system 200.

FIG. 3 is a flowchart of an example method 300 for execution by a computing device 104 for providing concurrent dead actor collection. Although execution of method 300 is described below with reference to computing device 104 of FIG. 1, other suitable devices for execution of method 300 may be used. Method 300 may be implemented in the form of executable instructions stored on a machine-readable storage medium, such as storage medium 120B, and/or in the form of electronic circuitry.

Method 300 may start in block 305 and continue to block 310, where computing device 104 receives a blocked notification from an actor in a distributed system. The actor may be provided by another computing device in the distributed system, and the blocked notification signals that the actor is a candidate for garbage collection. In response to the blocked notification, computing device 104 may request a blocked status for each actor in a loop subset managed by computing device 104 in block 315. In this example, computing device 104 may receive a blocked or unblocked notification from each of the actors in the loop subset, which allows computing device 104 to update the portion of the actor hierarchy that corresponds to the loop subset.

In block 320, if garbage computing device 104 determine that all actors in the loop subset are blocked, the actor can be identified as a dead actor and designated for garbage collection. Computing device 104 monitors each actor in the loop subset as described above to determine when each actor should be collected. Method 300 may then continue to block 325, where method 300 may stop.

Figure 4:
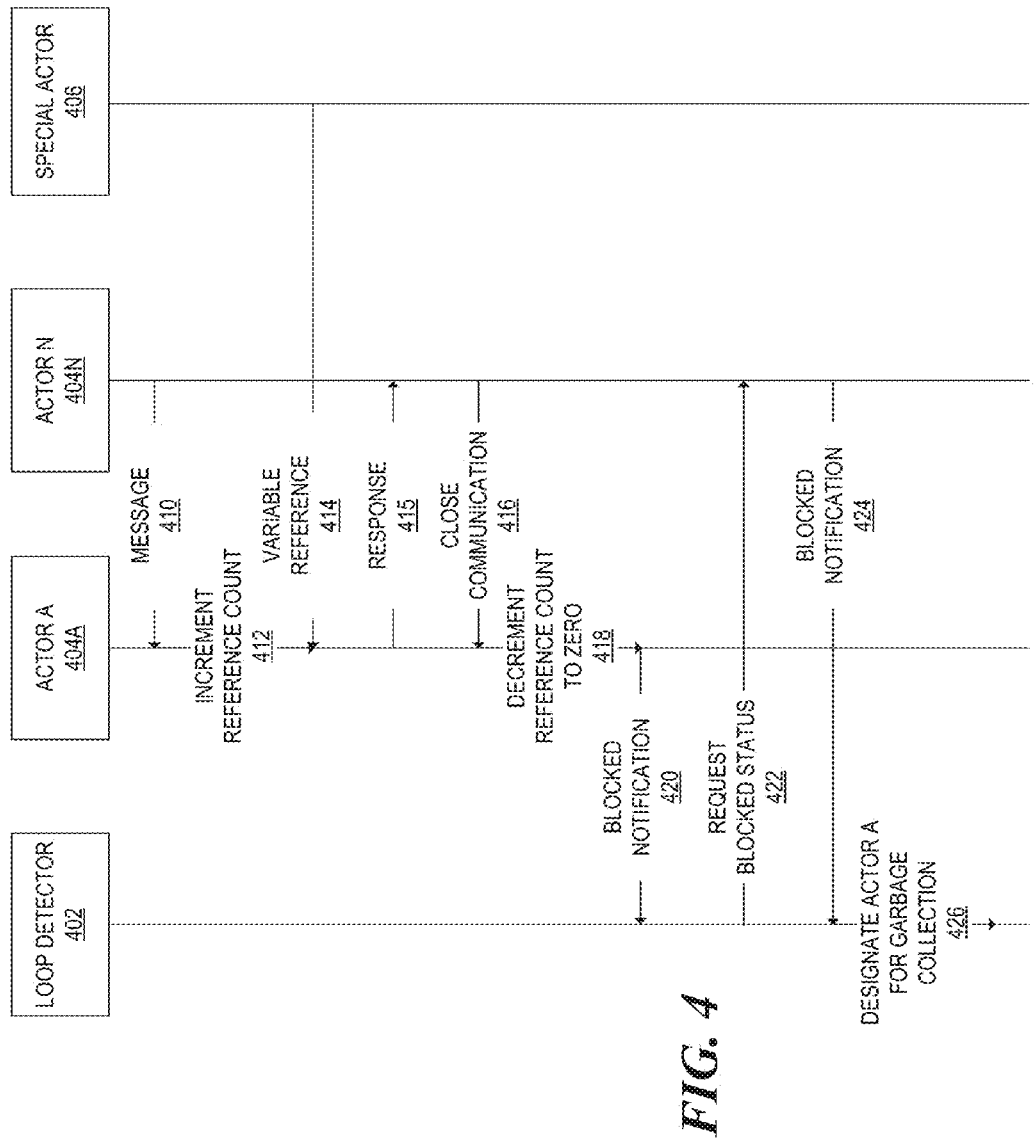
FIG. 4 is a workflow diagram showing an example system for providing concurrent dead actor collection.

FIG. 4 is a workflow diagram showing an example distributed system for providing concurrent dead actor collection. Workflow diagram shows a loop detector 402, an actor A 404A, an actor N 404N, and a special actor 406, which may each be similar to their corresponding components described above with respect to FIGS. 1 and 2.

In block 410, actor N 404N sends a message to actor A 404A. The message may request that actor A 404A perform an action in the distributed system. In block 412, the reference count for incoming edges is incremented in response to the incoming message. In block 414, a variable reference is provided by special actor 406 to actor A 404A. Because the variable reference does not request a response, the reference count is not incremented.

In block 415, actor A 404A provides a response to actor N 404N that notifies that the message of block 410 has been satisfied. In block 416, actor N 404N may close its communication link with actor A 404A. In block 418, actor A 404A decrements the reference count for incoming edges to zero. After the reference count for incoming edges is set to zero, actor A 404A sends a blocked notification to loop detector 402. The blocked notification notifies loop detector that actor A 404A is a candidate for garbage collection.

In block 422, loop detector 402 requests the blocked status from actor N 404N. In block 424, actor N 404N sends a blocked notification to loop detector 402. In block 426, loop detector 402 determines that all actors in a loop subset managed by loop detector 402 are blocked and designates actor A 404A for garbage collection.

Figure 5:
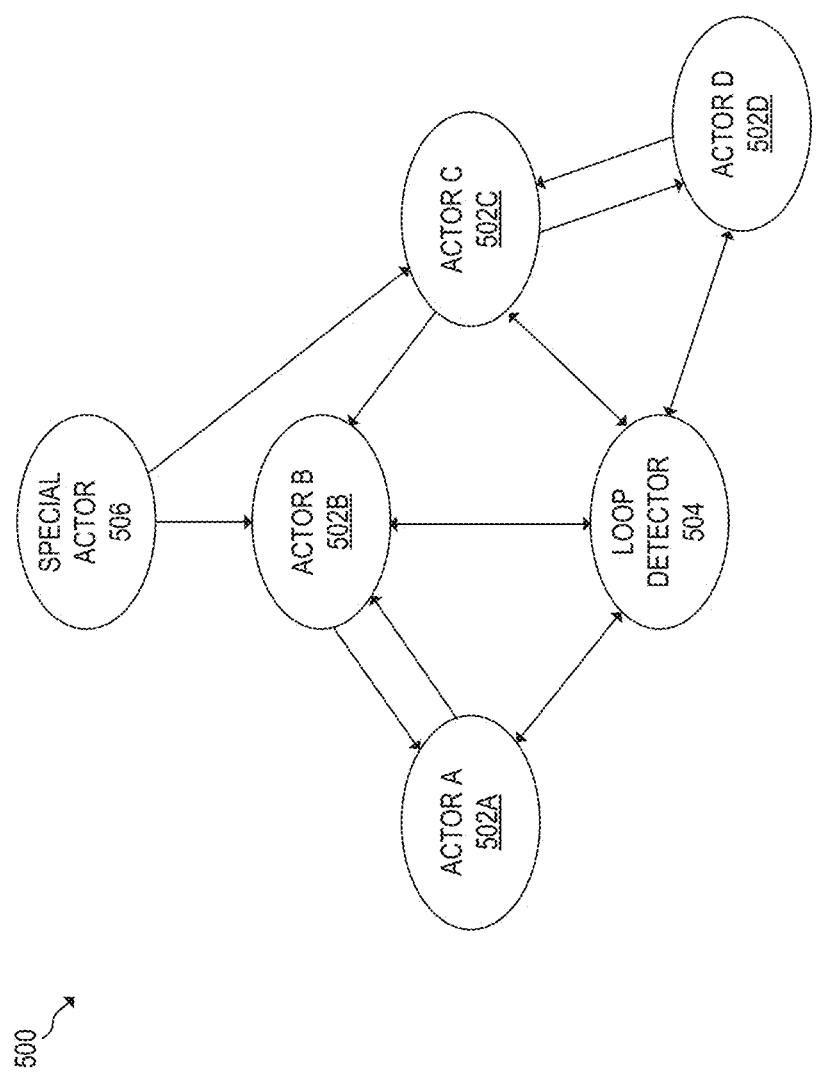
FIG. 5 is an example actor hierarchy to be used for concurrent dead actor collection.

FIG. 5 is an example actor hierarchy 500 to be used for concurrent dead actor collection. The actor hierarchy includes actors 502A, 502B, 502C, 502D, loop detector 504, and special actor 506. In this example, actor A 502A, actor B 502B, and actor C 502 are in a first loop subset managed by loop detector 504, and actor C 502C and actor D 502D are in a second loop subset managed by loop detector 504.

Actor hierarchy 500 shows that actor B 502B can have incoming edges from actor A 502A and actor C 502C. Accordingly, if loop detector 504 receives a blocked notification from actor B 502B, loop detector 504 should determine the blocked status of actor A 502A and actor C 502C before designating actor B 502B for garbage collection. Special actor 506 only has outgoing edges but does not affect the reference count of actor B 502B and actor C 502C.

The foregoing disclosure describes a number of examples for concurrent dead actor collection. In this manner, the examples disclosed herein identify dead actors for garbage collection by using loop detectors to monitor the blocked status of loop subsets of actors.

I claim:

1. A system for concurrent dead actor collection, comprising:
a plurality of processors configured to execute a distributed application of a distributed system;
a plurality of actors arranged in an actor hierarchy of communication links between the plurality of actors in the distributed system; and
a loop detector associated with a loop subset of the plurality of actors in the distributed system;
wherein a first actor associated with the loop subset is configured to:
be reclaimed by garbage collection after becoming a dead actor;
receive incoming messages from each of the other actors in the loop subset;
determine an incoming reference count from the incoming messages waiting to be processed by the first actor; and
in response to determining that the incoming reference count is zero, send a blocked notification to the loop detector,
wherein the loop detector is configured to:
in response to receiving the blocked notification, request a blocked status response from each other actor in the loop subset,
wherein the blocked status response depends on a state of each of the other actors; and
after determining from the requested blocked status responses that all of the other actors in the loop subset are blocked, designate the first actor for the garbage collection.

2. The system of claim 1, further comprising:
a special actor comprising local variables and references that can be provided as outgoing messages to the plurality of actors, wherein the special actor cannot be collected by the garbage collection and the outgoing messages correspond to outgoing edges of the special actor in the actor hierarchy.

3. The system of claim 1, wherein the reference count is zero when the actor has responded to the incoming messages.

4. The system of claim 1, wherein the distributed system comprises a plurality of computing devices, wherein each of the plurality of computing devices provides at least one of the plurality of actors.

5. The system of claim 1, wherein the loop detector is a parent actor of the first actor in the actor hierarchy.

6. The system of claim 5, further comprising a garbage collector configured to concurrently collect resources associated with the first actor while operation of the distributed application continues.

7. A method for concurrent dead actor collection, comprising:
receiving a blocked notification from a first actor of a plurality of actors in a distributed system, wherein the plurality of actors are arranged in an actor hierarchy that describes a plurality of communication links between the plurality of actors;
in response to receiving the blocked notification, requesting a blocked status response from each other actor in a loop subset of the plurality of actors, wherein the first actor has an incoming edge extending from each of the other actors in the loop subset, and wherein the blocked status response depends on a state of each of the other actors in the loop subset; and
after determining from the requested blocked status response of each of the other actors that all of the incoming edges of the first actor refer to blocked actors, designating the first actor for the garbage collection.

8. The method of claim 7, wherein the blocked notification is sent by the first actor when a reference count of incoming edges of the first actor is zero.

9. The method of claim 7, wherein the distributed system comprises a plurality of computing devices, wherein each of the plurality of computing devices provides at least one of the plurality of actors.

10. The method of claim 7, wherein the loop detector is a parent actor of the first actor in the actor hierarchy.

11. The method of claim 10, wherein the garbage collection concurrently collects resources associated with the first actor while operation of the distributed application continues.

12. A non-transitory machine-readable storage medium encoded with instructions executable by a processor for providing concurrent dead actor collection, the machine-readable storage medium comprising instructions to:
receive a blocked notification from a first actor of a plurality of actors in a distributed system after a reference count of incoming edges of the first actor is determined by the first actor to be zero, wherein the plurality of actors are arranged in an actor hierarchy that describes a plurality of communication links between the plurality of actors;
in response to receiving the blocked notification, request a blocked status response from each other actor in a loop subset of the plurality of actors, wherein an incoming edge extends to the first actor from each of the other actors in the loop subset; wherein the blocked status response depends on a state of each of the other actors in the loop subset; and after determining from the requested blocked status responses that all incoming edges of the first actor refer to blocked actors, designate the first actor for garbage collection.

13. The non-transitory machine-readable storage medium of claim 12, wherein the distributed system comprises a plurality of computing devices, wherein each of the plurality of computing devices provides at least one of the plurality of actors.

14. The non-transitory machine-readable storage medium of claim 12, wherein each actor of the plurality of actors provides functionality of a distributed application of the distributed system.

15. The non-transitory machine-readable storage medium of claim 14, wherein the garbage collection concurrently collects resources associated with the first actor while operation of the distributed application continues.

* * * * *